United States Patent [19]
Satonaka

[11] Patent Number: 5,929,785
[45] Date of Patent: Jul. 27, 1999

[54] CONTROL DEVICE FOR VEHICLE

[75] Inventor: Hisashi Satonaka, Susono, Japan

[73] Assignee: Toyota Jidosha Kabushiki Kaisha, Japan

[21] Appl. No.: 08/941,079

[22] Filed: Sep. 30, 1997

[30] Foreign Application Priority Data

Oct. 3, 1996 [JP] Japan .................................. 8-263358

[51] Int. Cl.⁶ .................................................. G08G 1/16
[52] U.S. Cl. ..................... 340/903; 340/937; 340/435; 180/167; 348/116; 348/118; 382/104
[58] Field of Search ........................ 340/435, 901, 340/902, 903, 937, 942; 180/167, 169; 348/113, 116, 118; 382/104, 291

[56] References Cited

U.S. PATENT DOCUMENTS

| | | | |
|---|---|---|---|
| 3,793,621 | 2/1974 | McIntosh | 340/901 |
| 5,234,071 | 8/1993 | Kajiwara | 180/169 |
| 5,309,137 | 5/1994 | Kajiwara | 340/436 |
| 5,530,420 | 6/1996 | Tsuchiya et al. | 340/435 |
| 5,555,312 | 9/1996 | Shima et al. | 340/937 |
| 5,680,122 | 10/1997 | Mio | 340/932 |

FOREIGN PATENT DOCUMENTS

| | | | |
|---|---|---|---|
| 60-131327 | 7/1985 | Japan | 340/901 |
| 60-235016 | 11/1985 | Japan | 340/903 |
| 3-90916 | 4/1991 | Japan | 340/901 |
| 58-180346 | 10/1993 | Japan | 340/903 |

*Primary Examiner*—Jeffery A. Hofsass
*Assistant Examiner*—Van T. Trieu
*Attorney, Agent, or Firm*—Finnegan, Henderson, Farabow, Garrett & Dunner, L.L.P.

[57] ABSTRACT

A control device for a vehicle includes a position data detecting unit for detecting position data on a preceding vehicle, a picture taking unit for taking a picture in front in a traveling direction of the vehicle, a driving operation data detecting unit for detecting driving operation data on the preceding vehicle from the picture, and a control unit for performing a predetermined control on the basis of the position data on the preceding vehicle and the driving operation data thereon.

4 Claims, 9 Drawing Sheets

CONTROL DEVICE FOR VEHICLE

BACKGROUND OF THE INVENTION

1. Field of the Invention

The present invention relates to a control device which performs warning or running control on the basis of a distance between one's own vehicle and a preceding vehicle.

2. Description of the Related Art

Until now, some devices are developed, which detect a distance between one's own vehicle and a preceding vehicle by using a radar, and which, on the basis of the distance between the two vehicles, perform warning or running control by using a throttle or brakes. For example, in Japanese Laid-Open Patent Application No. 60-131327, a running control device is described, which detects a distance between one's own vehicle and a preceding vehicle, and calculates a safety distance between two vehicles according to the speed of one's own vehicle. The control device detects a change of a distance between two vehicles exceeding a specified value, and outputs a vehicle speed holding signal for a specified time length. The control device calculates a rate of acceleration or deceleration for adjusting the speed of one's own vehicle so as to make the distance between two vehicles to be a safety distance between two vehicles. The control device changes a throttle valve opening according to the rate of acceleration or deceleration so as to hold the vehicle speed at a speed at which the vehicle was running just before the distance between two vehicles changes if the speed of a preceding vehicle is higher than the speed of one's own vehicle by a value exceeding a given value when a vehicle speed holding signal is inputted or the inputting is finished.

In the prior art devices, as position data of a preceding vehicle, only the distance between two vehicles is detected, and the running control is performed on the basis of the distance between two vehicles. Therefore, when a stop lamp of the preceding vehicle is lighted up but the deceleration is small, acceleration caused by the control of the distance between two vehicles for making the distance between two vehicles to be a target value, is continued because of the time delay prior to the detection of deceleration. However, the control does not fit the driving sensation of the driver.

Furthermore, a problem is known that when a preceding vehicle on one's own lane where one's own vehicle is running, flashes on and off a winker and departs to another lane, a delay in acceleration is felt. This is because the acceleration is not performed until the preceding vehicle completely departs from one's own lane. When a preceding vehicle on another lane adjacent to one's own lane, flashes on and off a winker and comes into one's own lane, a delay in finishing of acceleration is felt. This is because the acceleration may be performed until the preceding vehicle comes into one's own lane. The above control does not fit the driving sensation of the driver.

SUMMARY OF THE INVENTION

It is a general object of the present invention is to provide a control device in which the above disadvantages are eliminated.

A more specific object of the present invention is to provide a control device control device for a vehicle capable of performing a predetermined control such as a warning or running control which fits the driving sensation of a driver.

Figure 1:
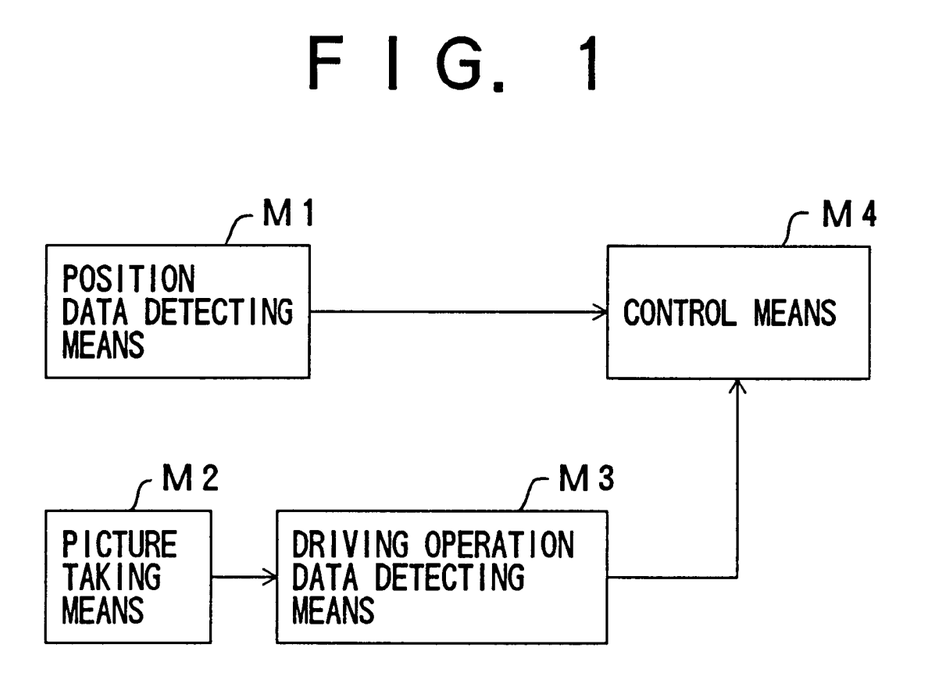
FIG. 1 is a block diagram of the principle of the present invention.

The above objects of the present invention are achieved by a control device for a vehicle as shown in FIG. 1. The control device includes position data detecting means M1 for detecting position data on a preceding vehicle, picture taking means M2 for taking a picture in front in a traveling direction of the vehicle, operation data detecting means M3 for detecting driving operation data on the preceding vehicle from the picture, and control means M4 for performing a predetermined control on the basis of the position data on the preceding vehicle and the driving operation data thereon.

The running of the preceding vehicle can be predicted on the basis of the position data and the driving operation data of the preceding vehicle. Hence, it is possible to perform, without a delay time, the predetermined control directed to, for example, acceleration and deceleration or warning. Thus, the control fits the driving sensation of a driver and drivability can be improved.

The predetermined control is related to, for example, acceleration and deceleration of the vehicle, or a warning control on the basis of the position data on the preceding vehicle and the driving operation data thereon.

The above control device may be configured so that the driving operation data detecting means detects the driving operation data related to a direction indicator of the preceding vehicle. The driving operation data such as data about a lane change or deceleration caused by a traffic congestion can be detected from the operation of the direction indicator.

The above control device may be configured so that the driving operation data detecting means comprises means for determining a detection area on the basis of the position data on the preceding vehicle and detects, from a part of the picture plane located in the detection area, the driving operation data on the preceding vehicle. The detection area for detecting the driving operation data is not detected from the whole picture plane but is detected from a specified part of the picture plane, that is, the detection area. Hence, the driving operation data can be efficiently obtained.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 2:
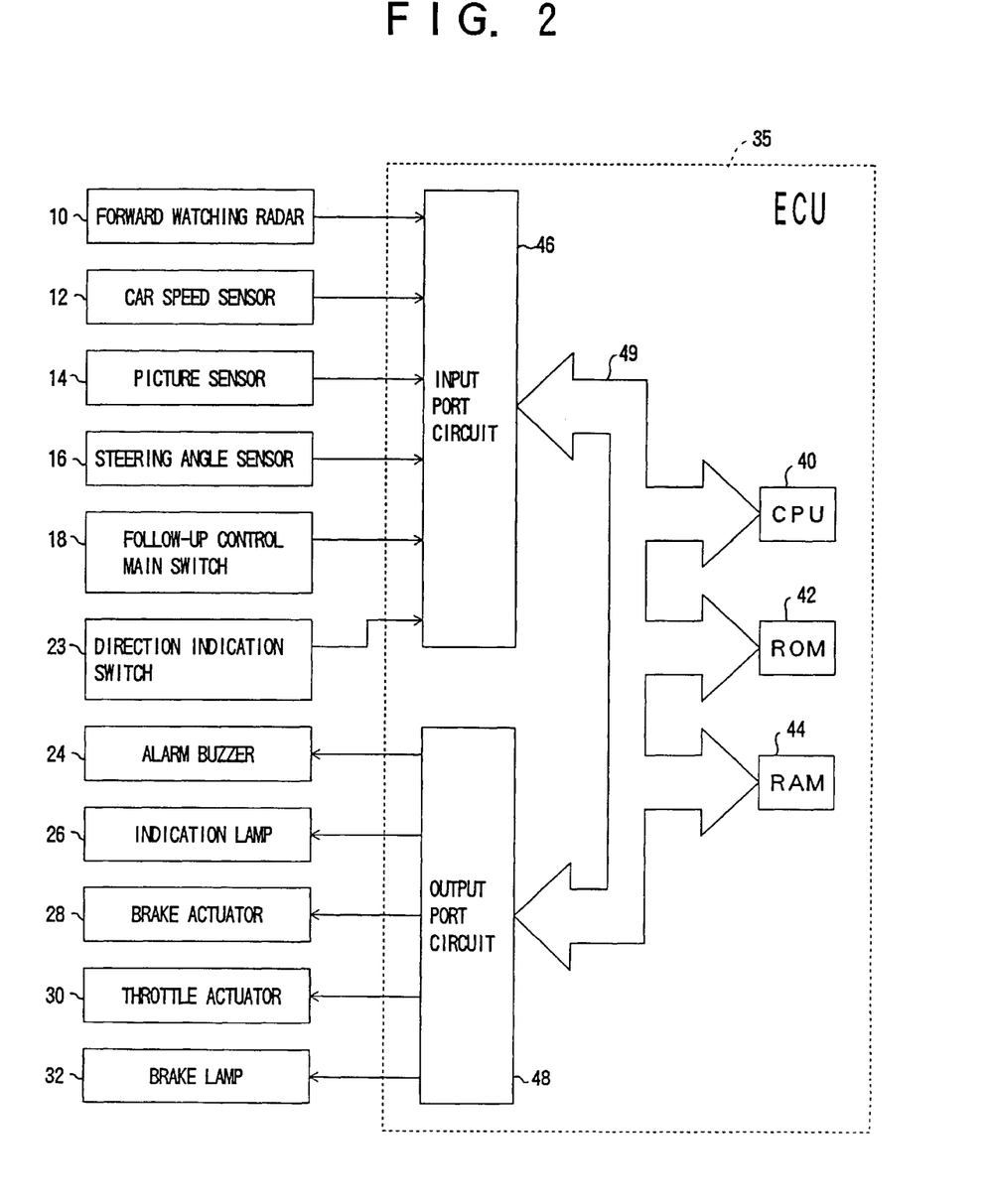
FIG. 2 is a block diagram of a control device according to an embodiment of the present invention.

FIG. 2 shows a block diagram of a control device according to an embodiment of the present invention. A forward watching radar 10 is, for example, an FM-CW radar using a millimeter wave, and the structure thereof will be described later. The relative speed and relative distance and scan angle of a target object detected by the forward watching radar 10 used as the aforementioned position data detecting means M1, are supplied to an electronic control unit (ECU) 35. A vehicle speed sensor 12 detects the speed of one's own vehicle and supplies it to the ECU 35.

A picture sensor 14 used as the picture taking means M2 takes a picture in front in the traveling direction of a vehicle having the structure shown in FIG.2, and supplies the picture data to the ECU 35. A steering angle sensor 16 detects a steering angle produced by the control of a steering wheel, and supplies the data to the ECU 35. A follow-up control main switch 18 is a switch by which a driver chooses whether to operate a follow-up control device (ON) or not (OFF). An ON/OFF signal thus obtained is supplied to the ECU 35. Furthermore, the follow-up control main switch 18 is directed to permitting traffic congestion follow-up control, and is different in function from a slow speed running mode setting switch of a prior art device to indicate start of the traffic snarl follow-up control. A direction indication switch 23 is operated to be ON by the driver when turning to the right or left, and a resultant signal is supplied to the ECU 35.

The electronic control unit 35 is formed of a microcomputer, which includes a central processing unit (CPU) 40, a read only memory (ROM) 42, a random access memory (RAM) 44, an input port circuit 46, and an output port circuit 48. These components are mutually connected by a two-way common bus 49. The input port circuit 46 are supplied with the output signals of the forward watching radar 10, the vehicle speed sensor 12, the picture sensor 14, the steering angle sensor 16, the follow-up control main switch 18, and the direction indication switch 23. The ROM 42 stores a control program. The CPU 40 performs various calculations (which will be described later) on the basis of the control program, and while doing so, the RAM 44 is used as a working area.

To the output port 48, connected are an alarm buzzer 24, an indication lamp 26, a brake actuator 28, a throttle actuator 30, and a brake lamp 32. The ECU 35 drives the alarm buzzer 24 to alarm, and lights up the indication lamp 26 and the brake lamp 32 to indicate the state of control. Moreover, the ECU 35 drives the brake actuator 28 to control braking, and drives the throttle actuator 30 to control the engine output power and control follow-up running.

Figure 3:
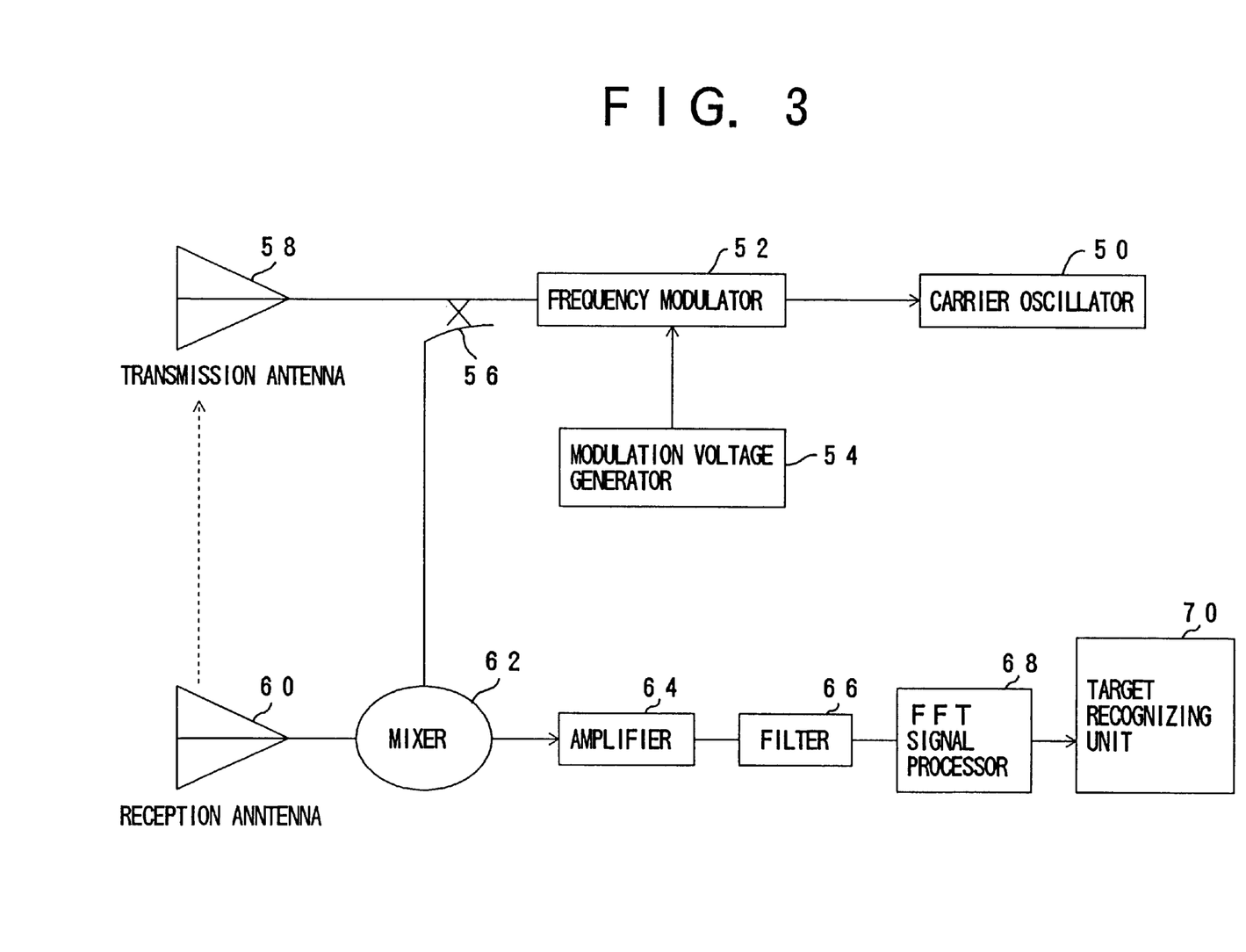
FIG. 3 is a block diagram of a radar used in the control device.

FIG. 3 is a block diagram of the forward watching radar 10. The radar 10 has a circuit on the transmission side, which includes a carrier oscillator 50, a frequency modulator 52, a modulation voltage generator 54, a directional coupler 56, and a transmission antenna 58. A carrier wave is outputted from the carrier oscillator 50 and is supplied to the frequency modulator 52. A triangular wave with an amplitude changing like a triangle is outputted from the modulation voltage generator 54, and is supplied to the frequency modulator 52 as a modulating wave. The carrier wave from the carrier oscillator 50 is subjected to a frequency modulation, and a transmission signal with a frequency changing like a triangle as time passes, is outputted. The transmission signal is supplied to the transmission antenna 58 through the directional coupler 56, and is emitted to an object to be detected. A part of the transmission signal is supplied to a mixer 62 of a circuit on the reception side (which will be described below) through the directional coupler 56.

The circuit on the reception side includes a reception antenna 60, a mixer 62, an amplifier 64, an anti-aliasing filter 66, a fast Fourier transform processor (FFT signal processor) 68; and a target recognizing unit 70. A reflected wave from the object to be detected is received by the reception antenna 60, and is supplied to the mixer 62. In the mixer 62, the reception signal and a part of the transmission signal from the directional coupler 56 are connected by a difference calculation, and a beat signal is thus generated. The beat signal from the mixer 62 is amplified by the amplifier 64, and is supplied to the FFT signal processor 68 and the target recognizing unit 70 through the anti-aliasing filter 66. The FFT signal processor 68 obtains a power spectrum of each of the frequency rising portion and the frequency falling portion, and supplies it to the target recognizing unit 70.

The target recognizing unit 70 detects the peak of the power spectrum of each of the frequency rising portion and the falling portion to perform pairing, and forms a pair of peaks corresponding to each of the target objects. A relative velocity frequency fd and a distance frequency fr are found from a peak frequency fup of the frequency rising portion of the pair of peaks and a peak frequency fdown of the frequency falling portion of the pair of peaks by using the following equations:

$$fd = (fdown - fup)/2 \qquad (a)$$

$$fr = (fdown + fup)/2 \qquad (b).$$

A relative distance R and a relative velocity V are found at the same time by using the following equations:

$$fd = 2 \cdot V/C \cdot f0 \qquad (c)$$

$$fr = 4 \cdot fm \cdot \Delta f / C \cdot R \qquad (d)$$

where C is the velocity of light, f0 is the central frequency, fm is the modulation frequency, and $\Delta f$ is a frequency change width. Furthermore, the forward watching radar 10 scans the front of the vehicle to the left and right for a given period, and holds a scan angle $\theta$ obtained when the target object is detected. The relative distance R, the relative velocity V, and the scan angle $\theta$ are supplied to the ECU 35.

Figure 4:
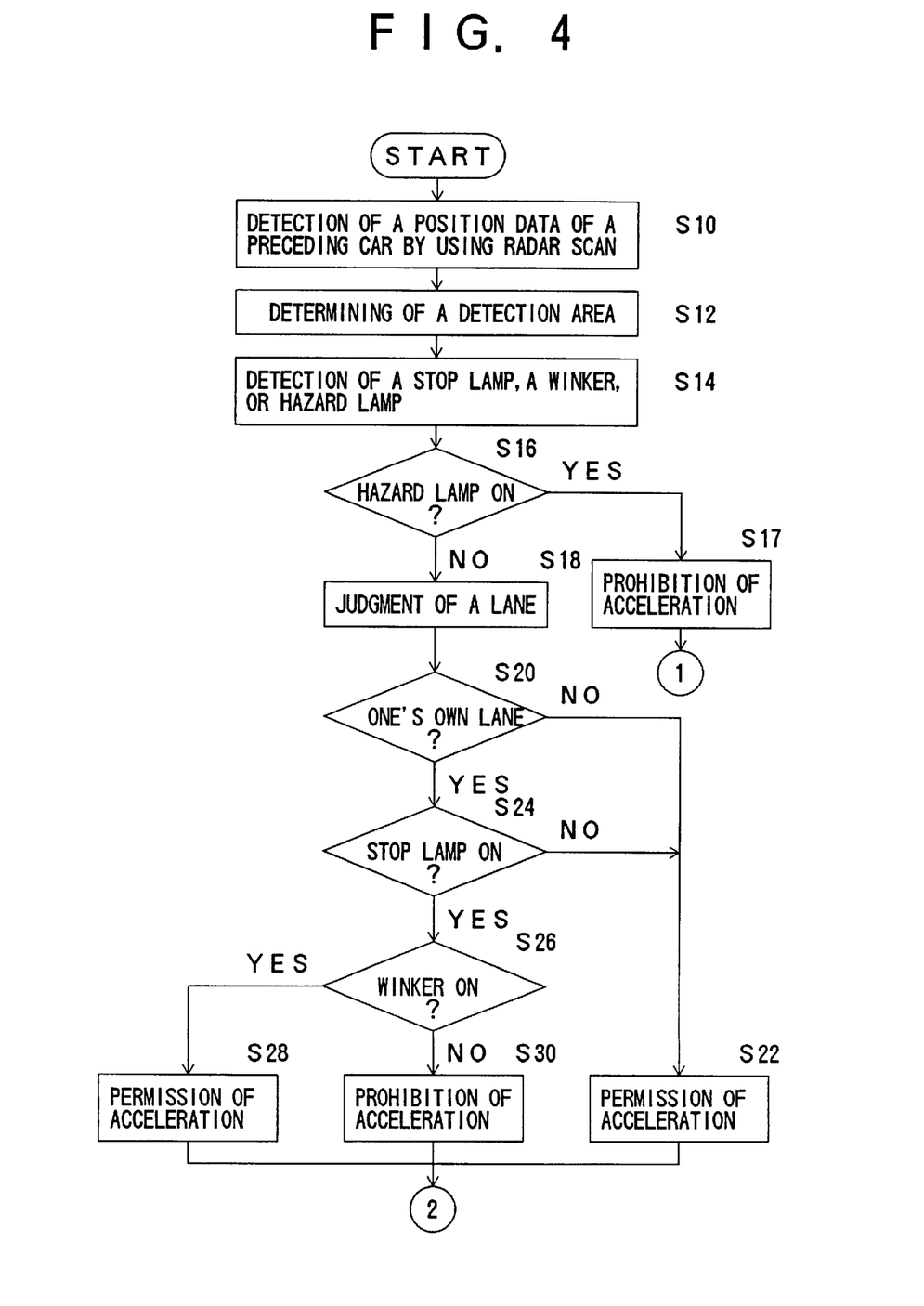
FIG. 4 is a flowchart of a part of a running control process executed in the control device shown in FIG. 2.
Figure 5:
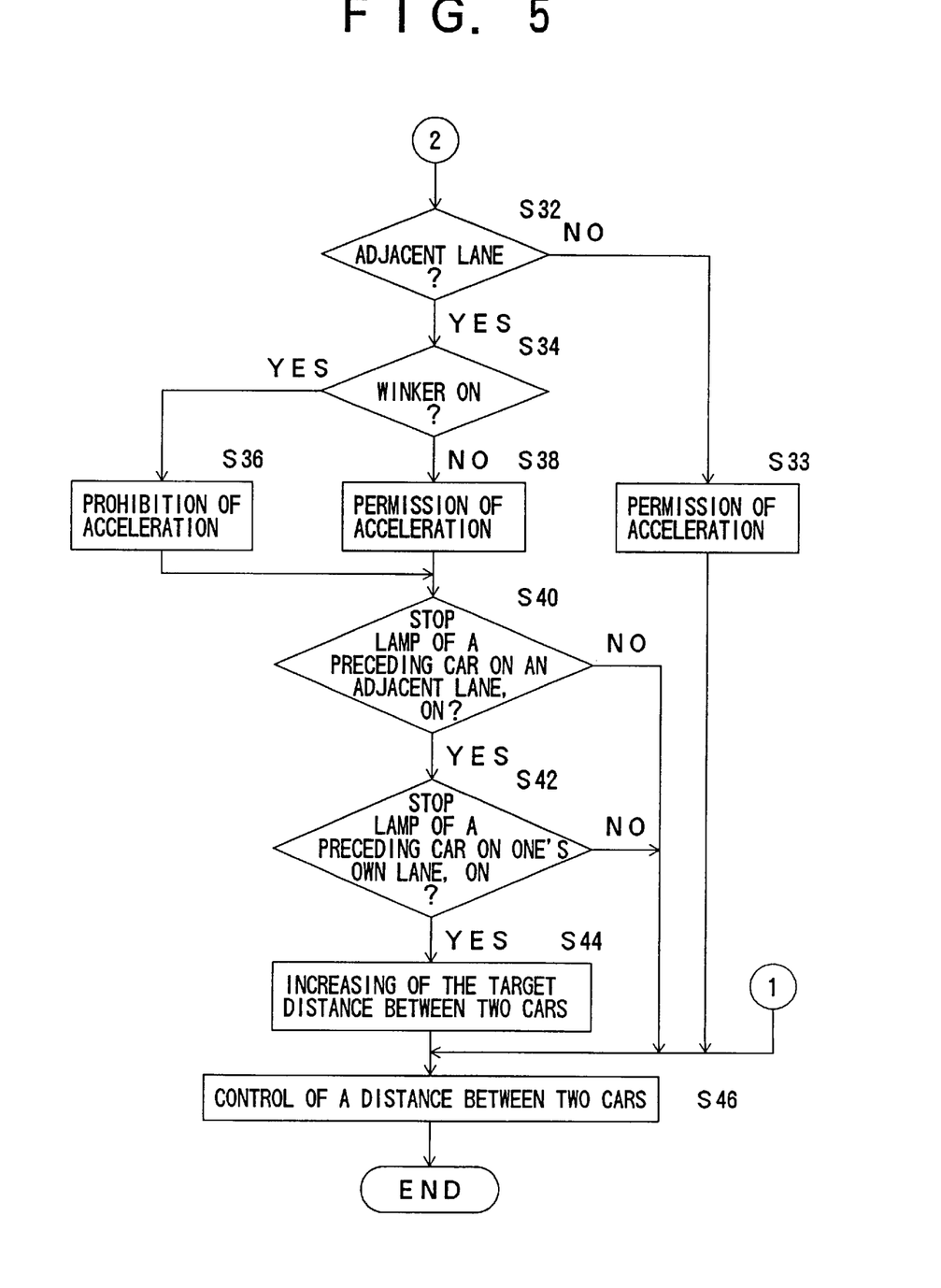
FIG. 5 is a flowchart of the rest of the running control process.
Figure 6:
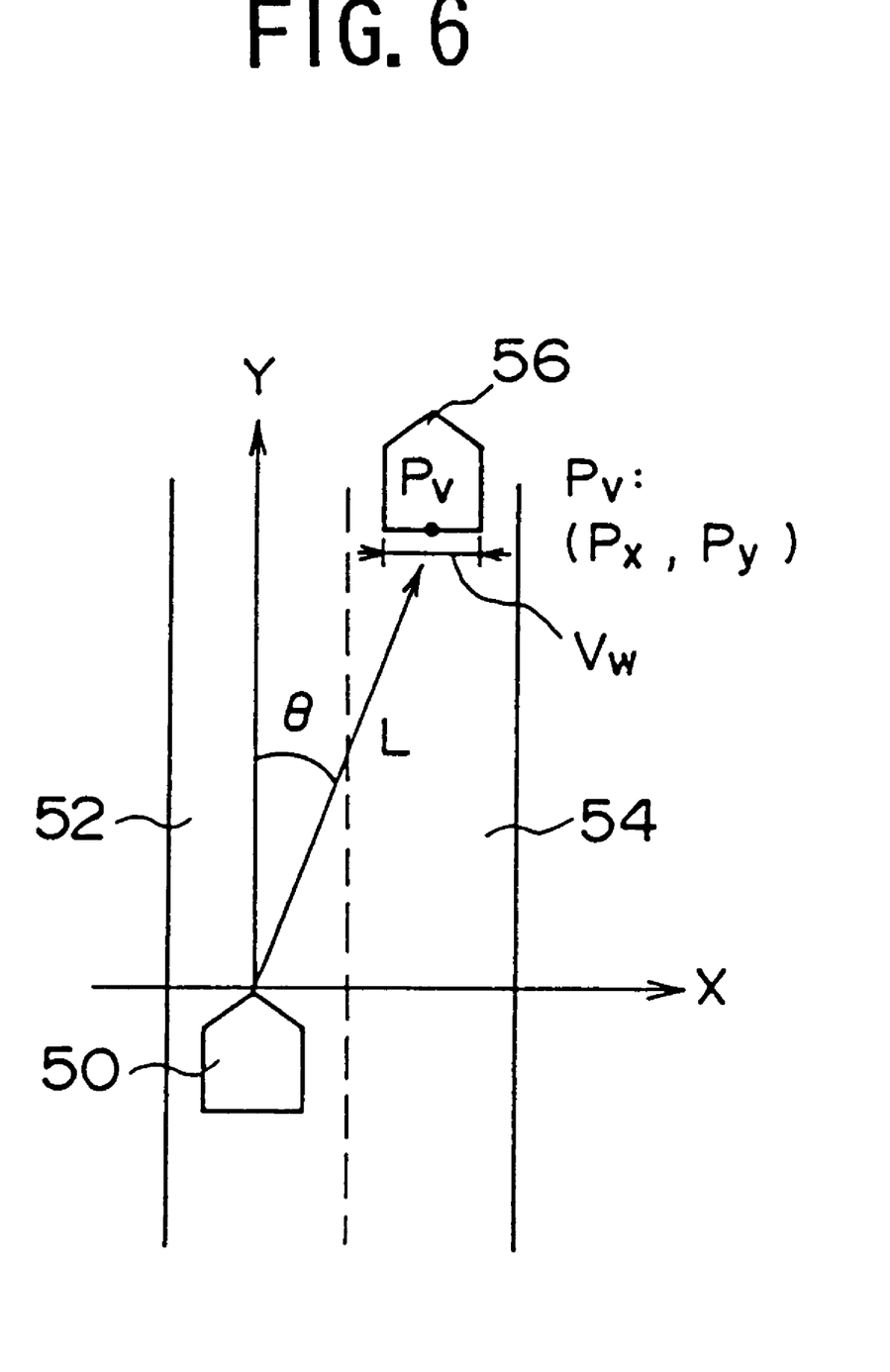
FIG. 6 is a diagram showing some parameters used in the running control process.

FIGS. 4 and 5 are flowcharts of a running control process executed by the ECU 35. The process is repeatedly executed at specified intervals in a state where the follow-up control main switch 18 is ON. In FIG. 4, at step S10, the forward watching radar 10 scans the front of one's own vehicle. The ECU 35 reads a relative distance (distance between two vehicles) L between one's own vehicle and a preceding vehicle which is a target object, and the scan angle $\theta$. The ECU 35 reads a vehicle width Vw from scan angles of the left and right ends of a preceding vehicle and the distance between the two vehicles. Thus, the ECU 35 detects a position data of a preceding vehicle. FIG. 6 shows that a preceding vehicle 56 on a lane 54 adjacent to a running lane 52 of one's own vehicle 50 is detected, and the distance L between two vehicles, the scan angle $\theta$, and the vehicle width Vw are detected. From the distance L between the two vehicles and the scan angle $\theta$, an XY position Pv (Px, Py) of the preceding vehicle, determined when making one's own vehicle to be the origin, can be found.

Figure 7:
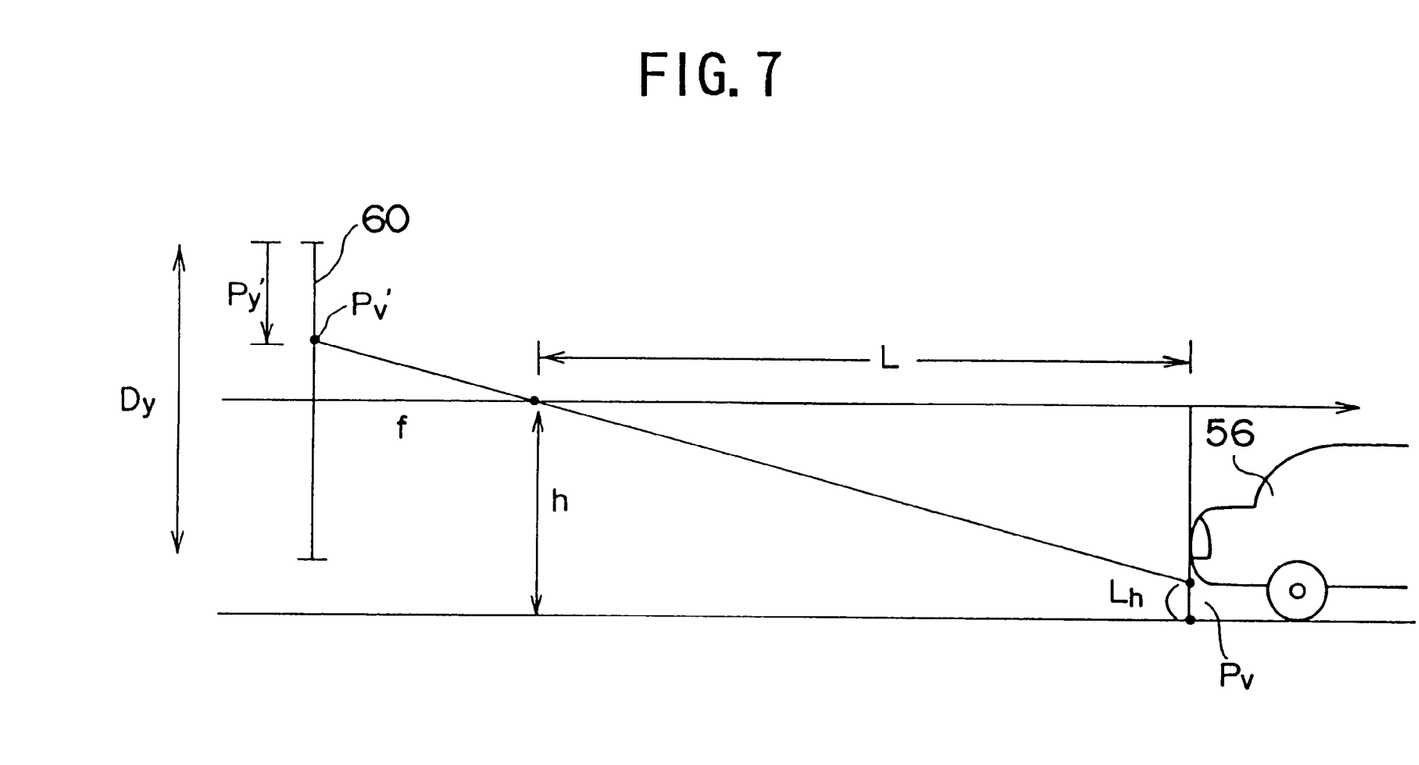
FIG. 7 is a diagram of a process for determining a detection area.
Figure 8:
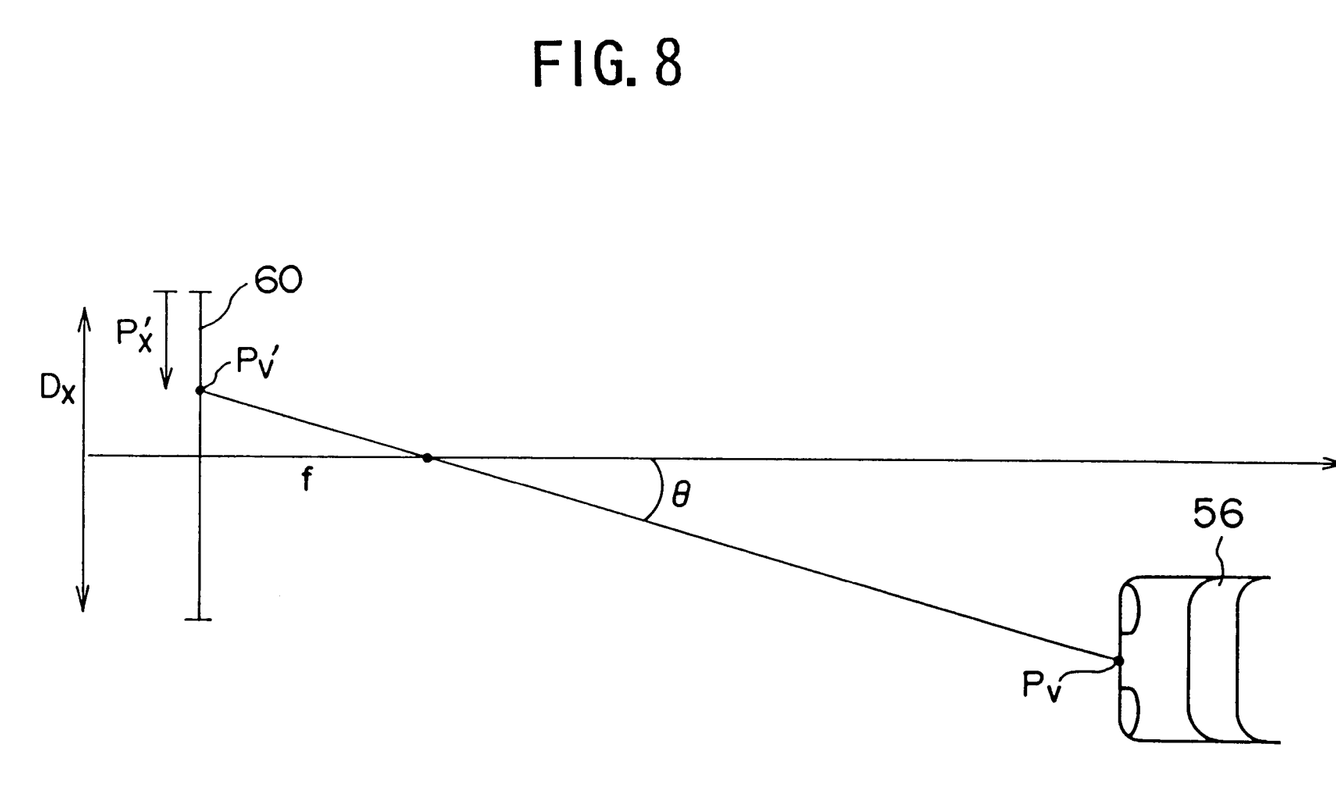
FIG. 8 is another diagram of the process for determining the detection area.

Next, the ECU 35 reads picture data taken by the picture sensor 14, and determines at least one detection area in the picture in order to detect a stop lamp and a direction indication lamp of the preceding vehicle 56. FIGS. 7 and 8 are respectively a side view and a plan view for explaining how to determine one or more detection areas. In FIG. 7, the Y-coordinate P'y of the center position P'v of the preceding vehicle in a picture taking plane 60 of the picture sensor 14, is expressed by the following equation:

$$P'y=(Dy/2)-f[(h-Lh)/L] \quad (1)$$

where Lh is the height of a mounting position of a stop lamp or the like in the preceding vehicle 56, h is the height of a mounting position of the picture sensor 14, f is the focal length of the picture sensor 14, and Dy is a width in the y direction of the picture taking plane 60.

Furthermore, in FIG. 8, the X-coordinate P'x of the center position P'v of the preceding vehicle in the picture taking plane 60 of the picture sensor 14 is expressed by the following equation:

$$P'x=(Dx/2)-t\cdot\tan\theta \quad (2)$$

where Dx is the width in the X direction of the picture taking plane 60.

Figure 9A:
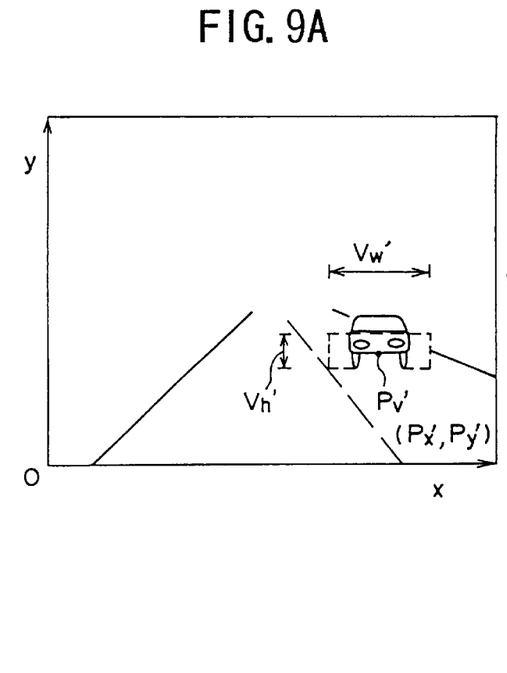
FIG. 9A is a diagram of a picture plane.
Figure 9B:
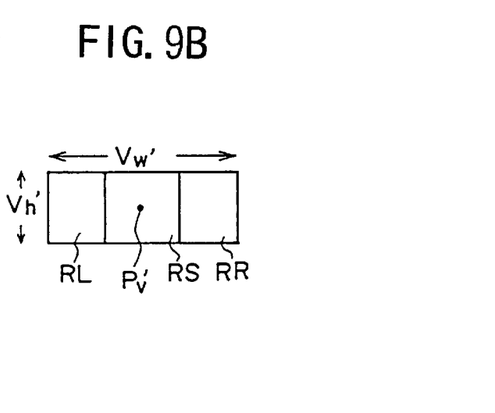
FIG. 9B is a diagram of detection areas obtained from the picture plane shown in FIG. 9A.

Here, for example, Dx=8.8 mm, Dy=6.6 mm, f=25 mm, h=1.3 m, Lh=0.3 m. In a photographed picture shown in FIG. 9A, an area is taken which has a lateral width V'w corresponding to the vehicle width Vw and a vertical width V'h corresponding to a height of 1 m, centered on the center position P'v (P'x, P'y) of the preceding vehicle. As shown in FIG. 9B, the area thus obtained is divided into three equal divisions in the X direction, and areas RL, RR on both ends are respectively made to be a stop lamp detection area and a direction indication lamp detection area. However, the above holds true for a case where the preceding vehicle is a vehicle having three ore more wheels. If the preceding vehicle is a two wheeled vehicle, a central area RS is made to be the detection area for detecting the stop lamp and the direction indication lamps. Moreover, if a vehicle width Vw cannot be found, the vehicle width Vw is set to a predetermined value equal to, for example, 2 m.

The detection areas are thus specified by using the position data on the preceding vehicle, so that the load of the next detecting process for the stop lamp ON state, the winker ON state, and the hazard lamp ON state can be decreased, and the processing speed can be improved.

Turning to FIG. 4 again, at step S14 corresponding to the aforementioned driving operation data detecting means M3, the ECU 35 determines whether the stop lamp, the winker, or the hazard lamp is ON. That is, the ECU 35 detects driving operation data of the preceding vehicle. For example, the ECU 35 detects a self-luminous body. When the color of the self-luminous body is red and lightning occurs in the left and right detection areas RL, RR at the same time, the ECU 35 judges that the stop lamp is ON. Furthermore, when the color of the self-luminous body is yellow and at least once flashing occurs in either the left and right detection areas RL, RR, or when the color of the self-luminous body is red and two or more times flashing occurs in either the left and right detection areas RL, RR, the ECU 35 judges that the winker is ON. Moreover, when the color of the self-luminous body is yellow or red and two or more times flashing occurs in the left and right detection areas RL, RR at the same time, the ECU 35 judges that the hazard lamp is ON.

At step S16, the ECU 35 determines whether the hazard lamp ON state is detected. If the hazard lamp ON state is not detected, the process proceeds to step S18. If the hazard lamp ON state is detected, the process proceeds to step S17. At step S18, the ECU 35 determines whether the running lane of the preceding vehicle is one's own lane or another lane from the steering angle detected by the steering angle sensor 16 and the scan angle detected by the forward watching radar 10. If there are a plurality of preceding vehicles, the lane setting is performed for each of the preceding vehicles. The above steering angle is used to determine whether one's own vehicle is running on a curve or not, and instead of the steering angle, a yaw rate or lateral acceleration may be used.

At step S20, the ECU 35 determines whether the preceding vehicle is judged to be on one's own lane. If the preceding vehicle is not on one's own lane, the process proceeds to step S22 at which setting of permission of acceleration is carried out. If the preceding vehicle is on one's own lane, the process proceeds to step S24, at which step the ECU 35 determines whether the stop lamp ON state of the preceding vehicle is detected. If the stop lamp ON state is not detected, the process proceeds to step S22 at which permission of acceleration is set.

If the stop lamp ON state of the preceding vehicle is not detected, the process proceeds to step S26 at which it is determined whether the winker ON state is detected. If the winker ON state is detected, permission of acceleration is set at step S28. Furthermore, if the winker ON state is not detected, prohibition of acceleration is set at step S30. That is, when the preceding vehicle is on one's own lane and the stop lamp is lighted up, acceleration is prohibited so as not to notice the decelerating preceding vehicle in a state where the winker is not flashing, and in a state where the winker is flashing, acceleration is permitted because the decelerating preceding vehicle is going out to another lane.

After performing the above step S22, S28, or S30, the process proceeds to step S32 shown in FIG. 5, at which step the ECU 35 determines whether the preceding vehicle is on an adjacent lane adjacent to one's own lane. If on an adjacent lane, the process proceeds to the step S34, and if not on an adjacent lane, the process proceeds to step S46. In step S34, the ECU 35 determines whether the winker ON state of the preceding vehicle is detected. If the winker ON state is detected, the process proceeds to step S36 at which prohibition of acceleration is set because the preceding vehicle is entering one's own lane from an adjacent lane. If the winker ON state of the preceding vehicle is not detected, the process proceeds to step S38 at which permission of acceleration is set because there is no chance that the preceding vehicle enters one's own lane.

After performing the above step S36 or S38, the process proceeds to step S40, at which the ECU 35 determines whether the stop lamp ON state of the preceding vehicle on an adjacent lane is detected. If affirmative, the ECU 35 determines, at step S42, whether stop lamp ON of the preceding vehicle on one's own lane is detected. If the stop lamp ON state of the preceding vehicle is detected on both the one's own lane and the adjacent lane, the road in front is taken as in a traffic congestion. At step S44, the ECU 35 increases the target distance between the two vehicles which is a reference of the running control, by, for example, approximately 20%. Then, the process proceeds to step S46, at which the ECU 35 drives the brake actuator 28 and the throttle actuator 30 to perform control of the distance between the two vehicles so that the distance is made to be the target distance between two vehicles. In the control of the distance between two vehicles, if permission of acceleration is set, acceleration by using throttle control is performed, but if prohibition of acceleration is set, acceleration by using throttle control is prohibited.

At steps S40 and S42, if the stop lamp ON state of the preceding vehicle is not detected on either the adjacent lane or one's own lane, the road in front is not taken as in a traffic congestion, and the process directly proceeds to step S46, at which step the distance between two vehicles is performed. At step S32, if no preceding vehicle is on the adjacent lane, permission of acceleration is set in step S33 and the process proceeds to step S46. Furthermore, if the hazard lamp ON state is detected in step S16, prohibition of acceleration is set in step S17, and the process proceeds to step S46, and the control of the distance between two vehicles is performed in step S46. The above steps S16 to S46 correspond to the control means M4.

Consequently, running of the preceding vehicle can be predicted on the basis of the position data and the driving operation data of the preceding vehicle, and control of acceleration and deceleration or warning can be performed without delay, and the control of acceleration and deceleration or warning fitting the driving sensation of the driver can be performed so that drivability is improved.

Figure 10:
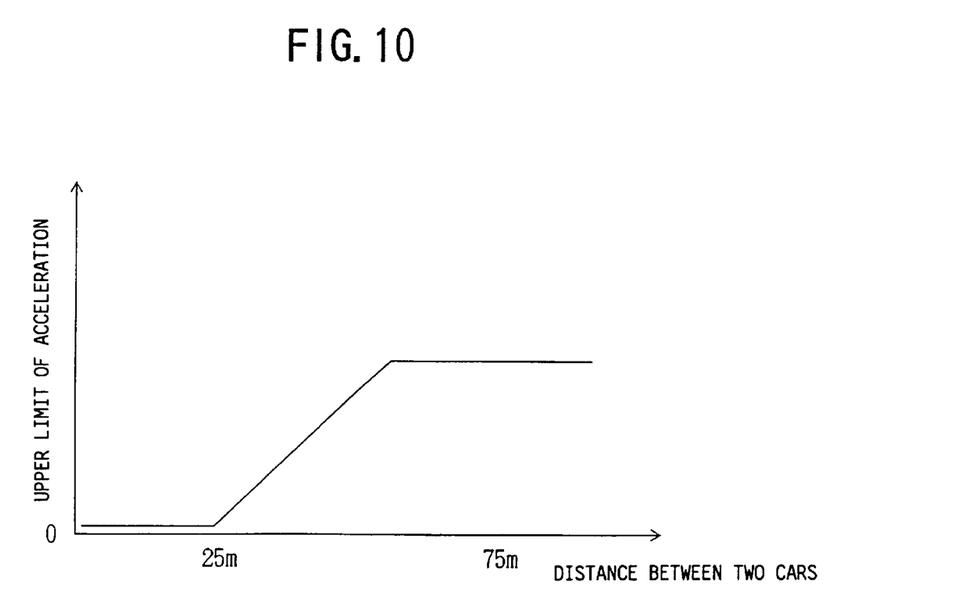
FIG. 10 is a graph of a relationship between an upper limit to acceleration and the distance between two vehicles.

Furthermore, step S36 may be arranged that instead of simple prohibition of acceleration, by using the distance between one's own vehicle and the preceding vehicle entering one's own lane from an adjacent lane, and by referring to a map shown in FIG. 10, the upper limit of acceleration corresponding to the distance between two vehicles is found, and acceleration up to the upper limit of acceleration is permitted. Thus, a running control which more fits the driving sensation of a driver can be performed, and drivability is improved.

Moreover, in a device which issues a warning of a rear end collision instead of performing the running control, it may be arranged that a warning is issued in the steps S30 and S36 of FIGS. 4 and 5. In that case, the steps S22, S28, S33, S38, S46 are unnecessary.

The present invention is not limited to the specifically disclosed embodiments, and variations and modifications may be made without departing from the scope of the present invention.

What is claimed is:

1. A control device for a vehicle comprising:

position data detecting means for detecting position data on a preceding vehicle;

picture taking means for taking a picture in front in a traveling direction of the vehicle driving operation data detecting means for detecting driving operation data on an indicator of the preceding vehicle from the picture, said driving operation data detecting means including
   means for determining a detection area on the basis of the position data on the preceding vehicle, and
   means for detecting, from a part of the picture plane located in said detection area, the driving operation data on the preceding vehicle; and control means for performing a predetermined control on the basis of the position data on the preceding vehicle and the driving operation data thereon.

2. The control device as claimed in claim 1, wherein said control means performs acceleration and deceleration of the vehicle on the basis of the position data on the preceding vehicle and the driving operation data thereon.

3. The control device as claimed in claim 1, wherein said control means performs a warning process which generates a warning on the basis of the position data on the preceding vehicle and the driving operation data thereon.

4. The control device as claimed in claim 1, wherein said driving operation data detecting means detects the driving operation data related to a direction indicator of the preceding vehicle.

* * * * *